United States Patent
Sumser et al.

(10) Patent No.: US 7,350,356 B2
(45) Date of Patent: Apr. 1, 2008

(54) EXHAUST GAS TURBOCHARGER FOR AN INTERNAL COMBUSTION ENGINE

(75) Inventors: Siegfried Sumser, Stuttgart (DE); Helmut Finger, Leinfelden-Echterdingen (DE); Paul Löffler, Stuttgart (DE); Peter Fledersbacher, Stuttgart (DE); Hans-Jürgen Weimann, Oppenweller (DE)

(73) Assignee: Daimler AG, Stuttgart (DE)

( * ) Notice: Subject to any disclaimer, the term of this patent is extended or adjusted under 35 U.S.C. 154(b) by 105 days.

(21) Appl. No.: 10/521,993

(22) PCT Filed: Jun. 24, 2003

(86) PCT No.: PCT/EP03/06603

§ 371 (c)(1),
(2), (4) Date: Sep. 15, 2005

(87) PCT Pub. No.: WO2004/009961

PCT Pub. Date: Jan. 29, 2004

(65) Prior Publication Data

US 2006/0096287 A1 May 11, 2006

(30) Foreign Application Priority Data

Jul. 20, 2002 (DE) ................................ 102 33 042

(51) Int. Cl.
- *F02B 33/44* (2006.01)
- *F02D 23/00* (2006.01)
- *F01B 25/02* (2006.01)
- *F04D 15/00* (2006.01)
- *F04D 27/00* (2006.01)

(52) U.S. Cl. .................. 60/605.1; 60/602; 60/611; 415/158; 415/157

(58) Field of Classification Search .............. 60/602, 60/605.1, 611; 415/157–160
See application file for complete search history.

(56) References Cited

U.S. PATENT DOCUMENTS

| 3,369,737 | A | * | 2/1968 | Switzer et al. ............... 415/87 |
| 3,460,748 | A | * | 8/1969 | Erwin ....................... 415/160 |
| 5,267,829 | A |   | 12/1993 | Schmidt et al. ............ 415/157 |
| 5,560,208 | A | * | 10/1996 | Halimi et al. ................ 60/602 |
| 5,855,117 | A |   | 1/1999 | Sumser et al. ............. 415/158 |
| 6,079,211 | A | * | 6/2000 | Woollenweber et al. ...... 60/602 |
| 6,224,333 | B1 |  | 5/2001 | Loeffler et al. .............. 60/602 |
| 6,378,307 | B1 | * | 4/2002 | Fledersbacher et al. ....... 60/602 |
| 7,073,334 | B2 | * | 7/2006 | Sumser et al. .............. 60/602 |
| 7,127,893 | B2 | * | 10/2006 | Schmid et al. ............ 415/158 |
| 2002/0116926 | A1 | * | 8/2002 | Sumser et al. .............. 60/611 |
| 2005/0265822 | A1 | * | 12/2005 | Fledersbacher et al. ..... 415/118 |

FOREIGN PATENT DOCUMENTS

CH 407401 * 2/1966

(Continued)

*Primary Examiner*—Thai-Ba Trieu
(74) *Attorney, Agent, or Firm*—Collard & Roe, P.C.

(57) ABSTRACT

An exhaust gas turbocharger for an internal combustion engine has an exhaust gas turbine in the exhaust gas train and a compressor in the intake tract, whereby an adjustable throttle device is provided upstream from the compressor wheel, for regulating the air mass stream to be supplied. The throttle device comprises a first guide grid and a second guide grid in the inflow region to the compressor wheel. Each guide grid possesses an adjustable grid geometry.

14 Claims, 5 Drawing Sheets

| | FOREIGN PATENT DOCUMENTS | | EP | 1077310 A1 * | 2/2001 |
|---|---|---|---|---|---|
| DE | 34 27 715 | 12/1985 | FR | 1303779 A * | 9/1962 |
| DE | 199 55 508 | 4/2001 | | | |
| DE | 100 49 198 | 4/2002 | * cited by examiner | | |

EXHAUST GAS TURBOCHARGER FOR AN INTERNAL COMBUSTION ENGINE

CROSS REFERENCE TO RELATED APPLICATIONS

Applicants claim priority under 35 U.S.C. §119 of German Application No. 102 33 042.5 filed Jul. 20, 2002. Applicants also claim priority under 35 U.S.C. §365 of PCT Application No. PCT/EP2003/006603 filed Jun. 24, 2003. The international application under PCT article 21(2) was not published in English.

BACKGROUND OF THE INVENTION

1. Field of the Invention

The invention relates to an exhaust gas turbocharger for an internal combustion engine.

2. Prior Art

An exhaust gas turbocharger having an exhaust gas turbine to be driven by the exhaust gases of an internal combustion engine as well as a compressor in the intake tract is described in the reference DE 199 55 508 C1; its compressor wheel is driven by the turbine wheel, by way of a shaft. Combustion air is to be supplied to the compressor wheel by way of a compressor inflow channel, under atmospheric pressure, which air is compressed to an elevated charging pressure by way of the rotational movement of the compressor wheel; the combustion air is supplied to the cylinders of the internal combustion engine at this charging pressure.

The compressor has an additional channel that extends approximately parallel to the compressor wheel inflow channel and opens radially into the compressor wheel inflow channel in the vicinity of the compressor wheel. Combustion air can also be supplied via the additional channel. An adjustable guide grid is disposed in the orifice region into the compressor wheel inflow channel, which grid is adjustable between a blocked position that minimizes the orifice cross-section, and a release position that maximally opens the cross-section. Furthermore, a throttle valve is disposed in the compressor wheel inflow channel, upstream from the orifice of the additional channel into the compressor wheel inflow channel, by way of which the air mass stream to be supplied, through the compressor wheel inflow channel, can be adjusted.

In order to minimize the rpm spread of the exhaust gas turbocharger and also in order to be able to maintain a noteworthy rpm level of the charger even in operating states of low load and speed of rotation of the internal combustion engine, the compressor can also be used in turbine operation. For this purpose, the throttle valve in the compressor wheel inflow channel is adjusted to its closed position, and the combustion air is guided radially onto the vanes of the compressor wheel, by way of the additional channel, which wheel thereupon experiences a rotational impulse for additional power. Relaxation of the supplied combustion air is achieved by way of the compressor wheel, so that a desired partial vacuum can be implemented in the air inlet of the internal combustion engine, at a partial load of the internal combustion engine. In this manner, the charger is kept in rotation, which makes it possible to thereby clearly improve the transient behavior of the exhaust gas turbocharger. The transition to compressor operation with an increasing load can be performed within a shorter period of time.

SUMMARY OF THE INVENTION

Proceeding from this state of the art, the invention is based on the problem of further improving the degree of effectiveness of an exhaust gas turbocharger, using simple means.

This problem is solved by an exhaust gas turbocharger according to an embodiment of the invention. Practical further developments are also described.

The compressor in the exhaust gas turbocharger according to the invention possesses a first guide grid as well as a second guide grid in the inflow region to the compressor wheel, whereby each guide grid has an adjustable grid geometry. In this manner, additional adjustments are possible, and diverse flow conditions can be implemented in a broad parameter range in the inflow region to the compressor wheel, and as a result, turbine operation of the compressor can be adjusted at low loads of the internal combustion engine, so that the charger can be kept at a high minimum speed of rotation even in these operating states.

In order to adjust this turbine operation of the compressor, it is practical if one of the guide grids is brought into its blocked position, with a minimal or completely closed cross-section, and the other guide grid is put into the opened position, whereby the guide grids are disposed in such a manner that both turbine operation and conventional compressor operation is possible. In this connection, the guide grid to be opened at low loads is preferably located in an orifice region that radially surrounds the compressor wheel, between an air collection chamber that precedes the compressor wheel inflow channel, and the inflow channel, whereas the second guide grid, which is brought into its blocked position at low loads, is axially located ahead, and is positioned upstream from the compressor wheel in an orifice cross-section of the air collection chamber to the compressor wheel inflow channel. In turbine operation, the combustion air to be supplied therefore impacts the compressor wheel radially, i.e. with a tangential component, thereby applying a rotational impulse to the wheel, and additional drive power is available for the rotor, as a cold air turbine.

In the transient transition region, in contrast, it is practical if a progressive adjustment of the guide grids from the opened position to the blocked position and vice versa is possible. The guide grid that is responsible for turbine operation and is close to the compressor wheel can be brought from its opened position to the blocked position continuously or discontinuously (in discrete steps); at the same time, the guide grid that lies ahead, at a distance from the compressor wheel, which is assigned to compressor operation, is brought from the blocked position into the opened position, also continuously or discontinuously, so that an increasingly great air stream flows through the upstream guide grid. The possibility of being able to move each guide grid gradually between its opened and its blocked position, in each instance, allows a constant transition from cold air turbine operation to compressor operation. Thus it is particularly possible to first guide the greater portion of the air mass stream to be supplied by way of the guide grid assigned to cold air turbine operation, and to keep the portion that flows by way of the upstream guide grid low at first. This ratio reverses with a further increasing load of the internal combustion engine, in favor of an ever greater air mass stream portion through the upstream guide grid. In this manner, a sudden, jerk-like switch from cold air turbine operation to compressor operation, and therefore a drop in the speed of rotation of the charger, can be avoided.

To switch the guide grids between their extreme positions, in each instance (blocked position, on the one hand, and opened position, on the other hand), both an embodiment having a common setting or activation organ for both guide grids and an embodiment having separate activation organs are possible. In the case of a common activation organ, it is practical if the latter is configured as a setting sleeve; during the setting movement of this sleeve, the guide grids are adjusted into opposite positions. The setting sleeve is, in particular, an axially adjustable sliding sleeve, whereby in a particularly advantageous embodiment, part of the grid geometry of the guide grids, in each instance, is held on the axially opposite faces of the sliding sleeve, for example an accommodation matrix for accommodating a guide grid ring, on the one hand, and a guide grid ring on the opposite face, on the other hand. Of course, however, embodiments in which similar grid geometries are disposed in the region of the two axial faces of the sliding sleeve are also possible.

According to another embodiment, the setting sleeve can also be mounted to rotate, whereby in this case, the rotational movement of the setting sleeve is utilized for adjusting the grid geometries. Finally, it can also be practical to mount the setting sleeve so that it can be axially displaced and rotated, and to assign the axial setting movement to one of the two guide grids and the rotational movement to the other guide grid, thereby making it possible to uncouple the setting movements of the two guide grids.

An uncoupled movement is particularly made possible also in that two activation organs, configured separately, are provided, which are assigned to one guide grid, in each instance, and can be activated independent of one another. In this embodiment, a coupling of the movements by way of the control of each activation organ is possible, but kinematically, the two activation organs are configured independent of one another. In this manner, an additional mechanical degree of freedom is obtained for setting each guide grid, thereby making it possible to implement additional setting combinations for the positions of the guide grids and, in total, to perform a setting of the guide grids that is better adapted to the situation, in each instance.

In an advantageous embodiment, both activation organs are configured as a sliding sleeve, in each instance, which sleeves are axially displaceable, in each instance, whereby one of the two sliding sleeves is exclusively assigned to one guide grid, while the other sliding sleeve is configured for the displacement of both guide grids. If the sliding sleeve assigned to both guide grids is activated, the cross-section in both guide grids is changed with a common setting movement. In the case of activation of the opposite sliding sleeve, which is particularly used for changing the geometry of the guide grid assigned to compressor operation, however, the other guide grid is not adjusted. The guide grid impacted by both sliding sleeves, which is remote from the wheel, can be adjusted in that the orifice cross-section in which the guide grid close to the wheel is disposed is practically not influenced by the guide grid remote from the wheel, under a full load of the internal combustion engine.

BRIEF DESCRIPTION OF THE DRAWINGS

Other advantages and practical embodiments are evident from the claims, the description of the figures, and the drawings. These show:

In the figures, the same parts have the same reference symbols.

DETAILED DESCRIPTION OF THE INVENTION

Figure 1:
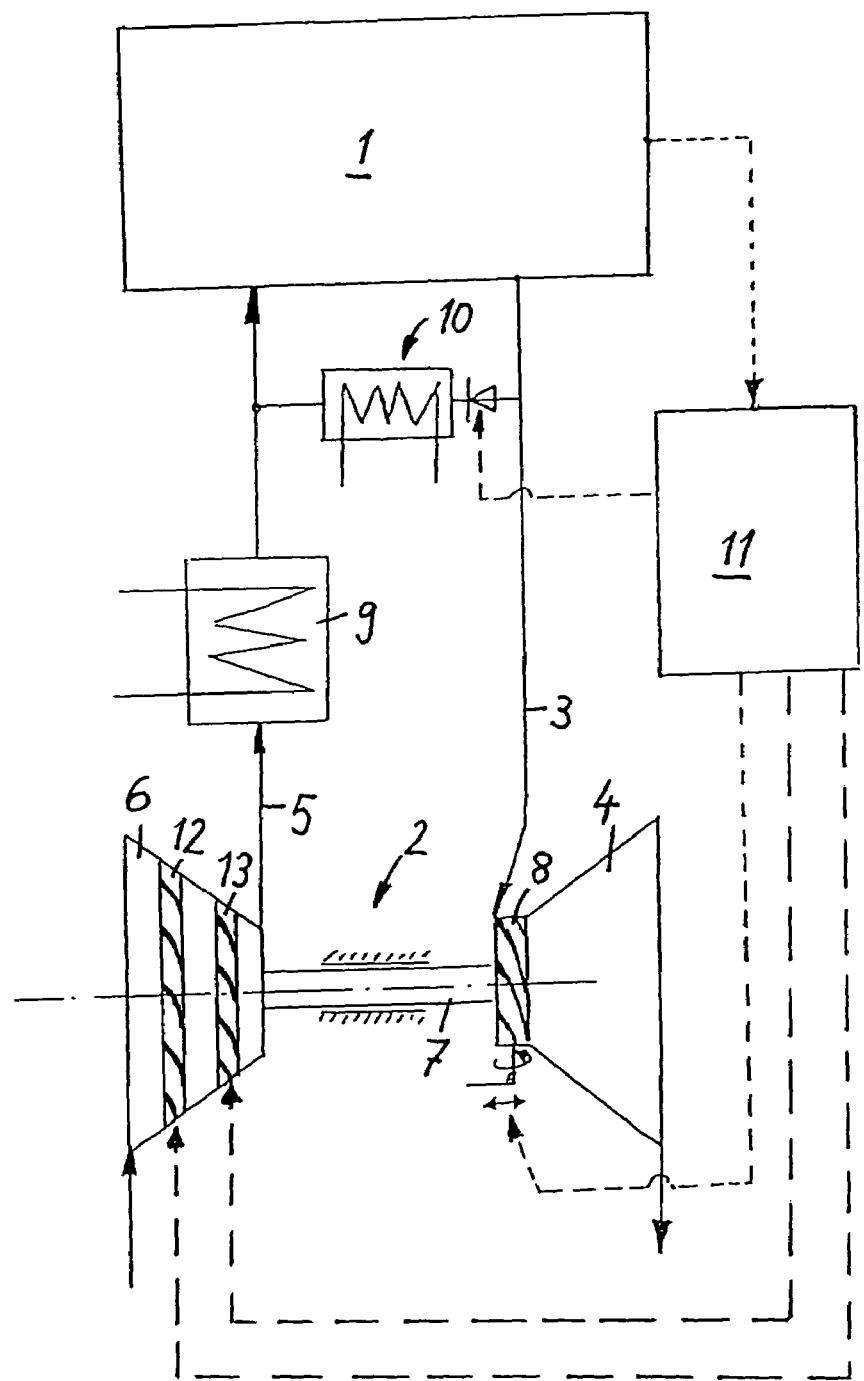
FIG. 1 a schematic representation of a charged internal combustion engine having an exhaust gas turbocharger having a variable turbine geometry and a compressor with two adjustable guide grids, FIG. 2 a longitudinal cross-section through a compressor, with the first guide grid, close to the compressor wheel, in the opened position, and the second guide grid, disposed axially at a distance from the compressor wheel, in the blocked position, FIG. 3 a representation corresponding to FIG. 2, but with the guide grid close to the compressor wheel in the blocked position and the guide grid at an axial distance in a first opened position, FIG. 4 another representation corresponding to FIGS. 2 and 3, but with the guide grid at an axial distance in the second opened position, FIG. 5 a face view, in a schematic representation, of the guide grid close to the compressor wheel (with a smaller radius) and the guide grid disposed at a greater axial distance (with a larger radius), FIG. 6 a representation corresponding to FIG. 5, whereby the outer guide grid is shown in a segment having a lesser number of vanes, FIG. 7 another frontal view of the guide grids, whereby the outer guide grid is shown having a minimal number of vanes in a third segment.

The internal combustion engine 1 shown in FIG. 1 is equipped with an exhaust gas turbocharger 2, which comprises an exhaust gas turbine 4 in the exhaust gas train 3 of the internal combustion engine, and a compressor 6 in the intake tract 5, the compressor wheel of which compressor is driven by the turbine wheel, by way of a shaft 7. In the operation of the internal combustion engine, the turbine wheel is put into rotation by the exhaust gases, whereupon combustion air is drawn in from the surroundings in the compressor, and compressed to an elevated pressure. The exhaust gas turbine 4 is additionally equipped with a variably adjustable turbine geometry 8, which allows a changeable adjustment of the effective flow entry cross-section to the turbine wheel as a function of current status variables and operational variables of the internal combustion engine.

Downstream from the compressor 6, a charging air cooler 9 is disposed on the intake tract 5, in which the compressed charging air is cooled. In the further progression, the charging air is supplied to the cylinder inlets of the internal combustion engine 1, under charging pressure.

Furthermore, an exhaust gas recirculation device 10 is assigned to the internal combustion engine 1, by way of which device exhaust gas from the exhaust gas train 3 can be recirculated upstream from the exhaust gas turbine 4, into the intake tract 5, downstream from the charging air cooler 9. The exhaust gas recirculation device 10 comprises a recirculation line between the exhaust gas train and the intake tract, as well as an adjustable valve and an exhaust gas cooler, disposed in the recirculation line.

The compressor 6 is equipped with a variable compressor geometry, which comprises two guide grids 12 and 13, both of which are disposed in the inflow region to the compressor wheel, and can be adjusted between a minimal blocked position and a maximal opened position. The function of the guide grids 12 and 13 will be explained in the following, using the additional figures.

The internal combustion engine 1 has a regulation and control unit 11 assigned to it, by way of which the various units assigned to the internal combustion engine can be adjusted as a function of status variables and operational variables of the internal combustion engine 1, particularly the recirculation valve in the exhaust gas recirculation device 10, the variable turbine geometry 8, as well as the two guide grids 12 and 13 in the compressor 6.

Figure 2:
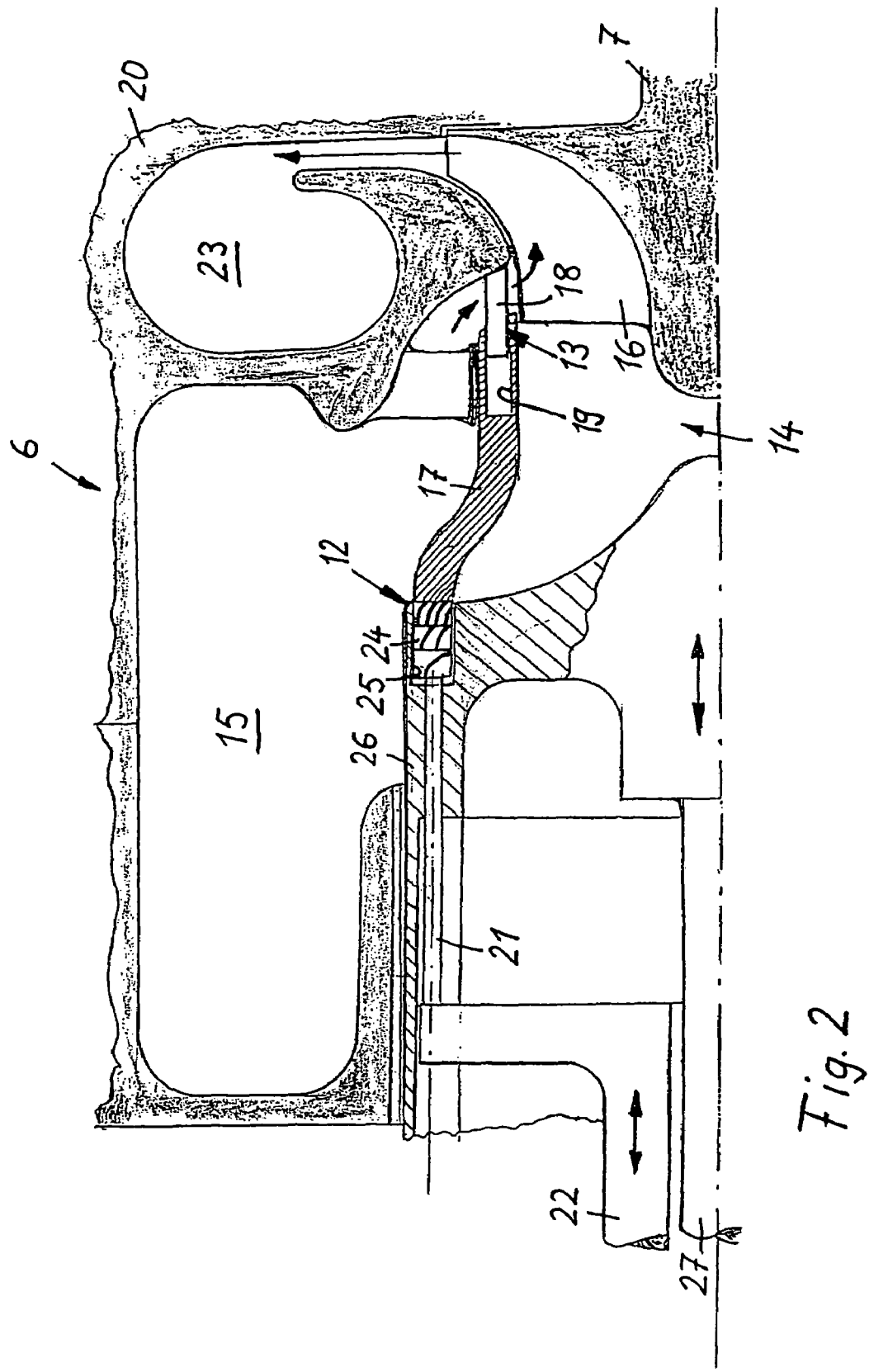

As is evident from the cross-sectional view according to FIG. 2, the guide grid 13 of the compressor 6 is located in the orifice region between an air collection chamber 15, in which combustion air is passed into the compressor from the outside, to a compressor wheel inflow channel 14, in which the compressor wheel 16 is mounted to rotate. The orifice region surrounds the compressor wheel 16 radially, at least in part. The grid geometry of the guide 13 consists of a guide grid ring 18 having vanes, whereby the guide grid ring 18 is disposed in the orifice region in ring shape, and surrounds the compressor wheel vanes of the compressor wheel 16 radially, at least in part, as well as an accommodation matrix 19, into which the guide grid ring 18 can be pushed axially. The guide grid ring 18 is connected with a wall of the compressor housing 20, fixed in place on the housing. The accommodation matrix 19 is configured in the region of an axial face of a sliding sleeve 17, which forms an activation organ for the guide grid 13. The sliding sleeve 17 is structured to be displaceable in the axial direction of the charger, and is adjusted between two axial end positions by a setting element 22, by way of a pusher rod 21. The grid geometry of the guide grid 13 is adjusted between a blocked position that minimizes or completely closes the orifice cross-section, and an opened position that maximizes the orifice cross-section, by way of the axial adjustment movement of the sliding sleeve 17. In FIG. 2, the grid geometry of the guide grid 13 is in its opened position, with the maximally possible cross-section. This position is assumed, in particular, in operating states of the internal combustion engine with a low load, in which the compressor wheel 16 is operated in turbine operation, in which the pressure downstream from the compressor is lower than upstream of the compressor.

The combustion air that flows radially out of the air collection chamber 15 and impacts the compressor wheel 16 exerts a rotational impulse on the compressor wheel, which provides power to the compressor wheel. The combustion air is guided into a spiral channel 23 in the further progression, and undergoes relaxation in this connection. From the spiral channel 23, the combustion air is guided into the cylinder inlets of the internal combustion engine, after having flowed through the charging air cooler, in the further progression.

The other guide grid 12 is located on the face of the sliding sleeve 17 that lies opposite the guide grid 13 that is close to the compressor wheel; this grid has a greater distance from the compressor wheel 16 both radially and axially than the guide grid 13 that lies close to the compressor wheel and is assigned to turbine operation of the compressor. The grid geometry of the guide grid 12 at a distance from the compressor wheel comprises, in similar manner as the guide grid 13, a guide grid ring 24 that is attached to the axial face of the sliding sleeve 17, as well as an accommodation matrix 25 that is configured in another sliding sleeve 26 that takes over the function of an activation organ. The guide grid 12 at a distance from the compressor wheel is seated in another orifice cross-section between the air collection chamber 15 and the compressor wheel inflow channel 14. In the closed or blocked position shown in FIG. 2, the guide grid ring 24 is completely moved into the accommodation matrix 25, so that the orifice cross-section is completely closed. This orifice cross-section is assigned to compressor operation and is opened with an increasing load of the internal combustion engine, by means of adjusting the guide grid 12.

Since the grid geometries of the two guide grids 12 and 13 are located on axially opposite faces of the sliding sleeve 17, an axial setting movement exerted on the sliding sleeve 17 by way of a setting element 22 causes a simultaneous transfer movement both of the guide grid ring 18 close to the compressor, and of the guide grid ring 24 at a distance from the compressor. The transfer movements of the two guide grid rings are kinematically coupled by way of the sliding sleeve 17.

The setting element 22 is structured to be axially displaceable. The setting movement of the setting element 22 is transferred to the sliding sleeve 17 by way of a pusher rod 21, whereby the pusher rod 21 is guided to be freely displaceable in a guide channel in a second sliding sleeve 26.

An additional adjustment possibility is provided by way of an axial pushing movement of the second sliding sleeve 26, triggered by way of activation of another axially displaceable setting element 27. The accommodation matrix 25 for accommodating the guide grid ring 24 of the guide grid 12 is configured in the axial face region of the sliding sleeve 26, whereby an axial setting movement of the additional sliding sleeve 26 can be performed kinematically independent of the setting movement of the first sliding sleeve 17.

Figure 3:
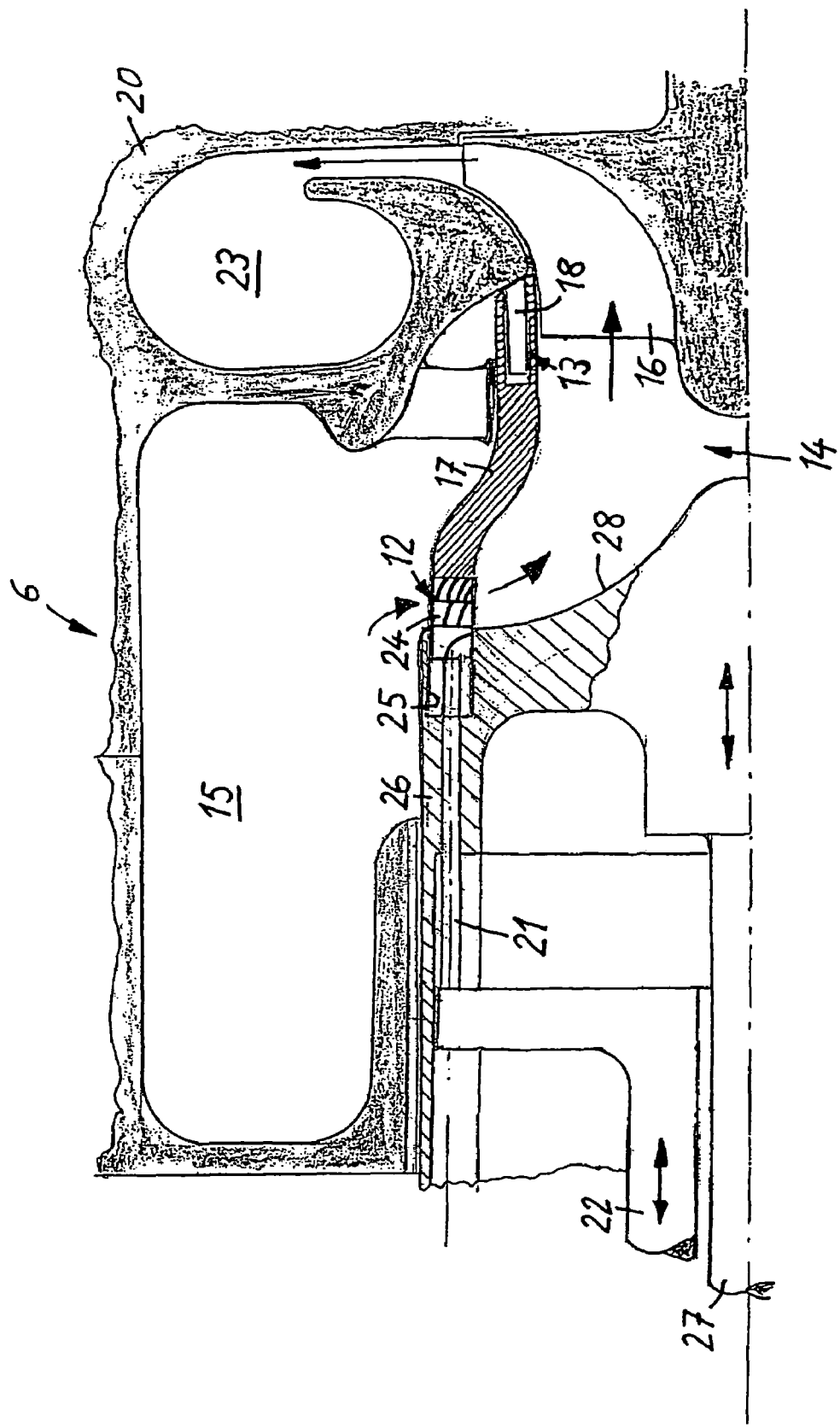

In FIG. 3, the compressor 6 is shown in a position in which the guide grid 13 is in the closed position and the guide grid 12 is partly open. The sliding sleeve 17 can be displaced axially, in the direction of the compressor wheel 16, to such an extend that the axial face of the sliding sleeve 17 makes contact with the wall of the compressor, on which the guide grid ring 18 is held. By means of this displacement movement of the sliding sleeve 17, the axially ahead guide grid 12 is brought into a partly open position, at the same time, in that the guide grid ring 24 is partly pushed out of its accommodation matrix 25. The air in the air collection chamber 15 can now flow radially into the compressor wheel inflow channel 14 through the guide grid ring 24, whereby the face 28 of the second sliding sleeve 26 forms a deflection surface or spin surface for the combustion air flowing into the compressor wheel inflow channel 14. The face 28 is configured in curved shape, and has a concave cross-section, so that the combustion air that flows in radially undergoes deflection in the axial direction, and impacts the compressor wheel vanes of the compressor 16 axially.

The guide grid ring 24 of the guide grid 12 at a distance from the compressor wheel is divided into three segments, for example, in which a different number of guide grid vanes is disposed, distributed over the circumference, in each instance. A solution proposal, not shown, relates to a number of vanes unchanged relative to grid 24a, in which the chord length of the vane is shortened with an increasing vane height. In the position shown in FIG. 3, the first two guide grid segments of the guide grid ring 24 are axially pushed out of the accommodation matrix 25, while the third segment of the guide grid ring 24 is still located within the accommodation matrix 25. The different number of guide grid vanes in each segment of the guide grid ring 24 makes it possible to adjust different flow conditions through the guide grid 12 as a function of the current axial position of the guide grid 12. With a decreasing number of vanes, the flow cross-section in the orifice region between the air collection chamber 15 and the compressor wheel inflow channel 14 increases, so that an increasingly greater air mass stream can pass over.

Figure 4:
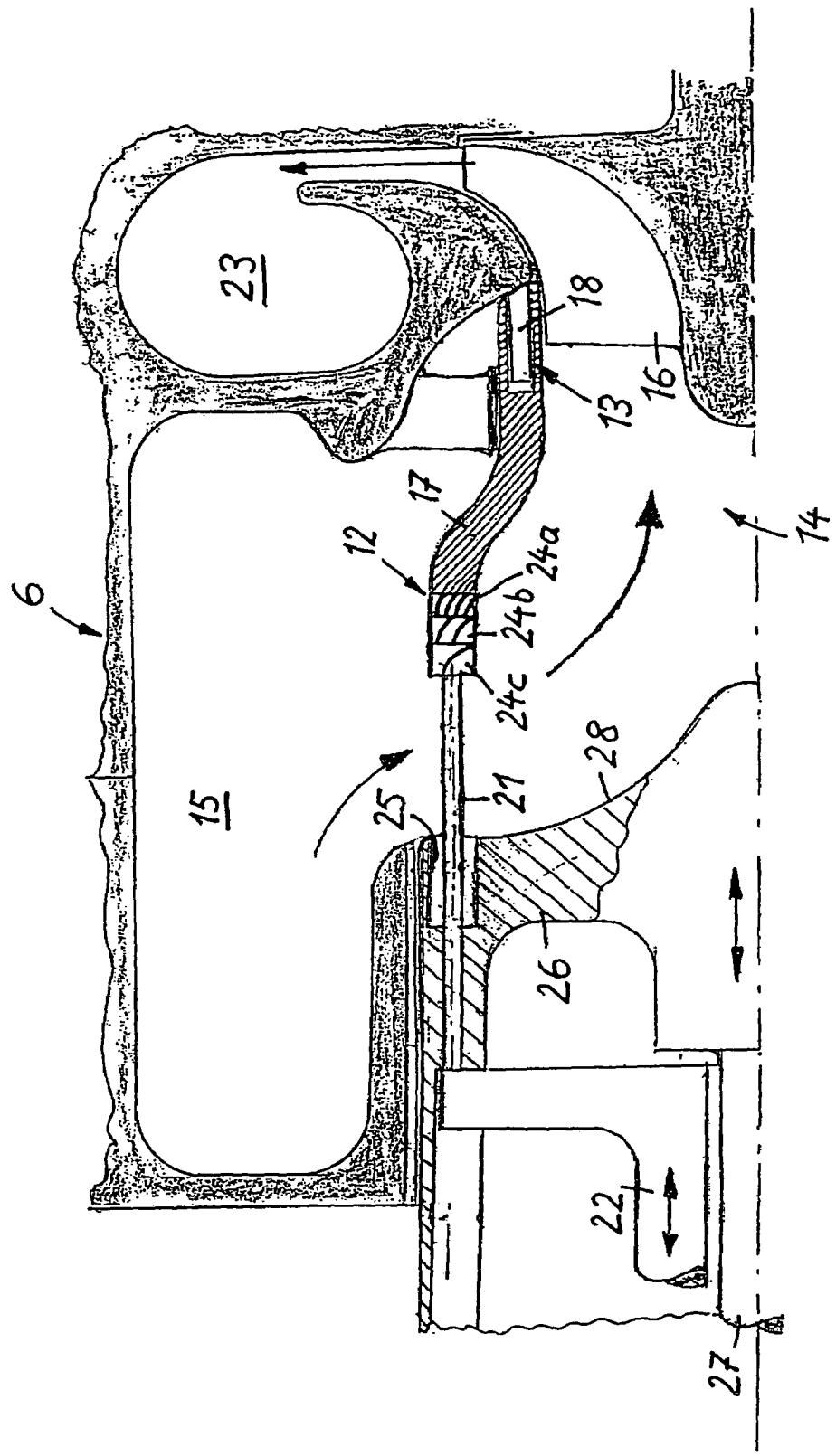

In FIG. 4, the sliding sleeve 17 is located in its contact position on the compressor housing wall that carries the guide grid ring 18. At the same time, the second sliding sleeve 26 is axially pulled out in the opposite direction, so that the guide grid ring 24 of the guide grid 12 at a distance from the compressor wheel is completely removed from the accommodation matrix 25 in the sliding sleeve 26, and only the pusher rod 21, by way of which the sliding sleeve 17 is connected with the setting element 22, projects into the orifice cross-section between the air collection chamber 15 and the compressor wheel inflow channel 14. As a result, there are practically no flow barriers present in the orifice region any more, and a maximally possible air mass stream can pass over and impact the compressor wheel 16 axially.

It might also be practical to structure one or both guide grids 12 and 13 with adjustable guide vanes, which are pivoted by suitable setting organs, about their pivot axis, in each instance, between the blocked position and the opened position. This embodiment can be provided both alternatively and cumulatively to the axial setting movement of the guide grids.

The different guide grid ring segments of the guide grid at a distance from the compressor wheel are indicated with the reference symbols 24a, 24b, and 24c in FIG. 4. These symbols are also used in the subsequent FIGS. 5, 6, and 7, in which both the guide grid 13 close to the compressor wheel and the guide grid 12 at a distance from the compressor wheel are shown in a top view, in each instance, whereby the latter grid is shown in the different axial segments 24a, 24b, and 24c, in each instance.

Figure 5:
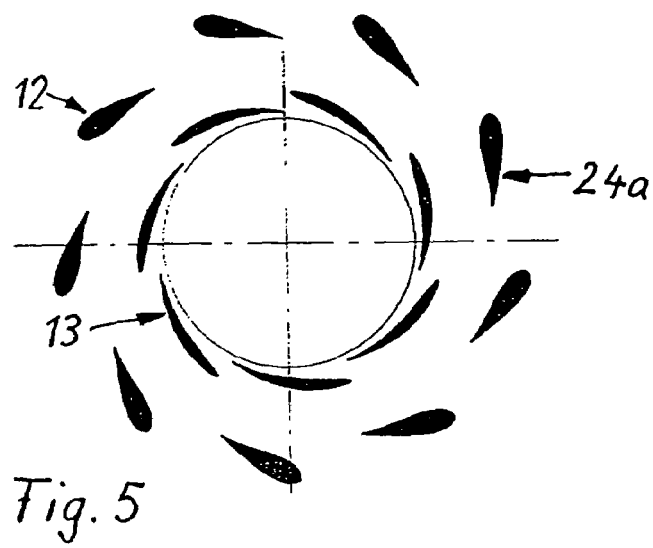
Figure 6:
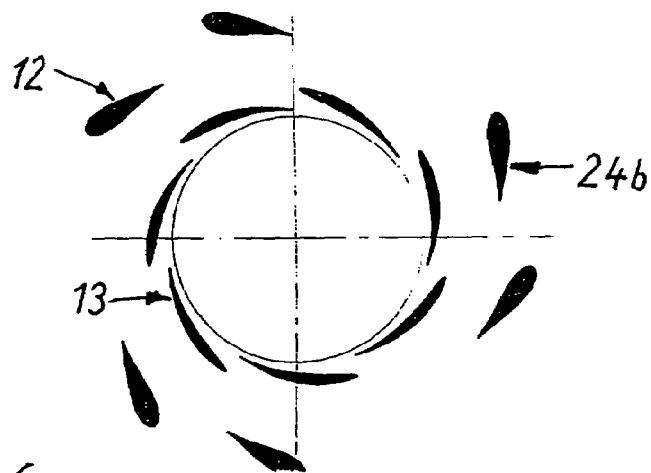
Figure 7:
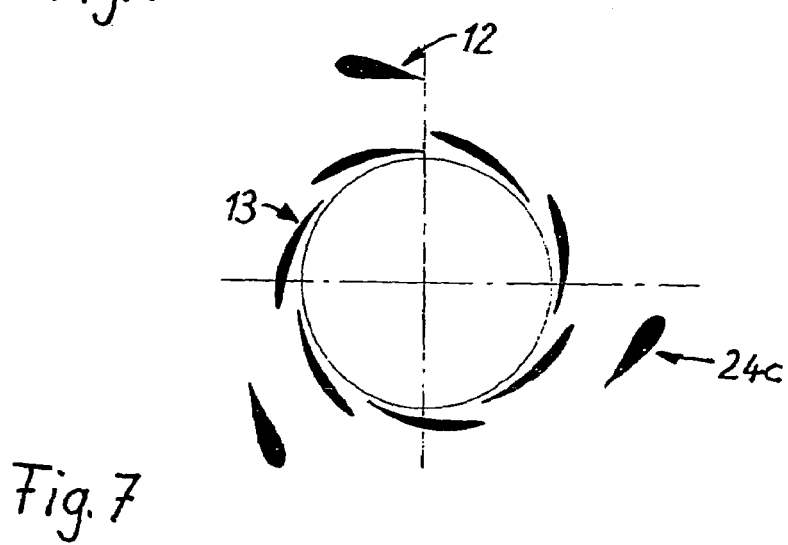

In the top view according to FIG. 5 to 7, the guide grid 12 at a distance from the compressor wheel surrounds the guide grid 13 close to the compressor wheel, at an axial distance of the two guide grids. In the first guide grid segment 24a of the guide grid 12 at a distance from the compressor wheel, a maximal number of guide vanes is disposed distributed over the circumference. In the other segments 24b and 24c according to FIGS. 6 and 7, respectively, there are only two-thirds of the guide vanes of the first segment in the center segment 24b, and in the third segment 24c there are actually only one-third the number of guide vanes as in the first segment 24a. The flow resistance is further reduced by this.

The invention claimed is:

1. An exhaust gas turbocharger for an internal combustion engine, having an exhaust gas turbine in the exhaust gas train and a compressor in the intake tract, whereby a compressor wheel is disposed in a compressor wheel inflow channel, which wheel is driven by a turbine wheel of the exhaust gas turbine, having an adjustable throttle device upstream from the compressor wheel, for regulating the air mass stream to be supplied, wherein the throttle device comprises a first guide grid and a second guide grid in the inflow region to the compressor wheel, whereby each guide grid has an adjustable grid geometry.

2. The exhaust gas turbocharger as claimed in claim 1, wherein the two guide grids are spaced axially apart.

3. The exhaust gas turbocharger as claimed in claim 1, wherein the grid geometries comprise one guide grid ring, in each instance, having guide vanes and an accommodation matrix for accommodating the guide grid rings.

4. The exhaust gas turbocharger as claimed in claim 1, wherein the setting movements of the grid geometries of the two guide grids are coupled by way of a common activation organ.

5. The exhaust gas turbocharger as claimed in claim 4, wherein the common activation organ comprises an axially adjustable sliding sleeve.

6. The exhaust gas turbocharger as claimed in claim 3, wherein the sliding sleeve has an accommodation matrix in the region of a first axial face, and a guide grid ring in the region of the opposite axial face.

7. The exhaust gas turbocharger as claimed in claim 1, wherein each grid geometry has an activation organ assigned to it, in each instance.

8. The exhaust gas turbocharger as claimed in claim 7, wherein the two activation organs are configured as a sliding sleeve, in each instance.

9. The exhaust gas turbocharger as claimed in claim 7, wherein an activation organ forms a spin surface for the air mass stream that flows through, in the opened position of a guide grid.

10. The exhaust gas turbocharger as claimed in claim 1, wherein an air collection chamber that communicates with the compressor wheel inflow channel lies ahead of the compressor wheel, whereby at least one guide grid is disposed in the transition from the air collection chamber to the compressor wheel inflow channel.

11. The exhaust gas turbocharger as claimed in claim 10, wherein the air collection chamber surrounds the compressor wheel inflow channel radially, at least in part.

12. The exhaust gas turbocharger as claimed in claim 1, wherein a guide grid has at least two segments having different grid geometries over its axial expanse.

13. The exhaust gas turbocharger as claimed in claim 12, wherein the segments each have a different number of guide grid vanes.

14. The exhaust gas turbocharger as claimed in claim 12, wherein the guide vanes of the guide grid continuously undergo a shortening of the chord length with an increasing vane height, proceeding from a bottom vane height.

* * * * *